United States Patent
Park

(10) Patent No.: US 9,088,186 B2
(45) Date of Patent: Jul. 21, 2015

(54) SPINDLE MOTOR

(71) Applicant: SAMSUNG ELECTRO-MECHANICS CO., LTD., Suwon (KR)

(72) Inventor: Young Ha Park, Suwon (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 333 days.

(21) Appl. No.: 13/709,565

(22) Filed: Dec. 10, 2012

(65) Prior Publication Data
US 2013/0154416 A1 Jun. 20, 2013

(30) Foreign Application Priority Data

Dec. 15, 2011 (KR) .................. 10-2011-0135253

(51) Int. Cl.
*F16C 32/06* (2006.01)
*H02K 7/08* (2006.01)
*H02K 5/167* (2006.01)

(52) U.S. Cl.
CPC .............. *H02K 7/086* (2013.01); *H02K 5/1677* (2013.01); *F16C 32/0633* (2013.01); *F16C 2370/12* (2013.01)

(58) Field of Classification Search
CPC .. H02K 7/086; H02K 5/1677; F16C 32/0633; F16C 2370/12
USPC .......................... 384/100, 107, 113, 115, 120
See application file for complete search history.

(56) References Cited

U.S. PATENT DOCUMENTS

2013/0022298 A1* 1/2013 Yu ................................. 384/115
2013/0033137 A1* 2/2013 Yu ................................. 384/113

FOREIGN PATENT DOCUMENTS

KR    10-2004-0075303    8/2004

* cited by examiner

*Primary Examiner* — Thomas R. Hannon

(57) ABSTRACT

There is provided a spindle motor including: a lower thrust member fixedly installed on a base member and including an extension part extended upwardly in an axial direction; a shaft having a lower end portion fixedly installed on the lower thrust member; a sleeve rotatably installed with respect to the shaft; an upper thrust member fixedly installed on the shaft to correspond to an upper portion of the sleeve; and a rotor hub rotating together with the sleeve, wherein an end portion of the extension part and a surface of the sleeve opposed thereto are provided with rounded surfaces.

4 Claims, 3 Drawing Sheets

SPINDLE MOTOR

CROSS-REFERENCE TO RELATED APPLICATIONS

This application claims the priority of Korean Patent Application No. 10-2011-0135253 filed on Dec. 15, 2011, in the Korean Intellectual Property Office, the disclosure of which is incorporated herein by reference.

BACKGROUND OF THE INVENTION

1. Field of the Invention

The present invention relates to a spindle motor.

2. Description of the Related Art

In general, a fixed shaft-type spindle motor in which a shaft having high impact resistance is fixed to a case of a hard disk driving device is generally mounted in an information recording and reproducing device such as a hard disk driving device for a server.

That is, the shaft is fixedly installed in the spindle motor mounted in the hard disk driving device for a server in order to prevent a hard disk mounted thereon from being damaged and thereby stopping information from being recorded thereon or read therefrom, due to an external impact.

In addition, since it is demanded that a spindle motor used for an enterprise hard disk driving device have a high degree of reliability, it is necessary to manage an amount of a lubricating fluid provided in a fluid dynamic bearing assembly including a fixed-type shaft.

Meanwhile, in the case in which lubricating fluid is provided in the fluid dynamic bearing assembly, generally, the lubricating fluid is provided in a space formed between a sleeve and a lower thrust member.

However, a end portion of the lower thrust member and a surface of the sleeve opposed thereto, between which the lubricating fluid is provided and flows, are formed to have a predetermined angle, such that a phenomenon of condensation of the lubricating fluid may be generated in a space formed between the end portion of the lower thrust member and the surface of the sleeve opposed thereto.

That is, in the case in which the lubricating fluid is injected into the space formed between the end portion of the lower thrust member and the surface of the sleeve opposed thereto, the lubricating fluid may not be further introduced by a capillary phenomenon and a flow of the injected lubricating fluid may be hindered.

Therefore, a process of injecting the lubricating fluid may not be smoothly performed, such that a manufacturing yield may be reduced.

SUMMARY OF THE INVENTION

An aspect of the present invention provides a spindle motor capable of suppressing generation of a phenomenon of condensation of lubricating fluid at the time of injecting the lubricating fluid.

According to an aspect of the present invention, there is provided a spindle motor including: a lower thrust member fixedly installed on a base member and including an extension part extended upwardly in an axial direction; a shaft having a lower end portion fixedly installed on the lower thrust member; a sleeve rotatably installed with respect to the shaft; an upper thrust member fixedly installed on the shaft to correspond to an upper portion of the sleeve; and a rotor hub rotating together with the sleeve, wherein an end portion of the extension part and a surface of the sleeve opposed thereto are provided with rounded surfaces.

A lubricating fluid may be injected via a space formed between the rounded surfaces of the extension part and the surface of the sleeve opposed thereto.

Either of a central portion of an outer peripheral surface of the shaft and a central portion of an inner peripheral surface of the sleeve may be provided with a recessed groove formed in a circumferential direction and having upper and lower inclined surfaces as upper and lower edges thereof.

The sleeve may form upper and lower bearing clearances together with the shaft and the upper and lower thrust members, and upper and lower portions of an outer peripheral surface of the sleeve are provided with upper and lower inclined portions so as to form liquid vapor interfaces together with the upper and lower thrust members.

The sleeve may include a communication hole allowing a space formed between the inner peripheral surface thereof and the recessed groove to be in communication with the outside.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
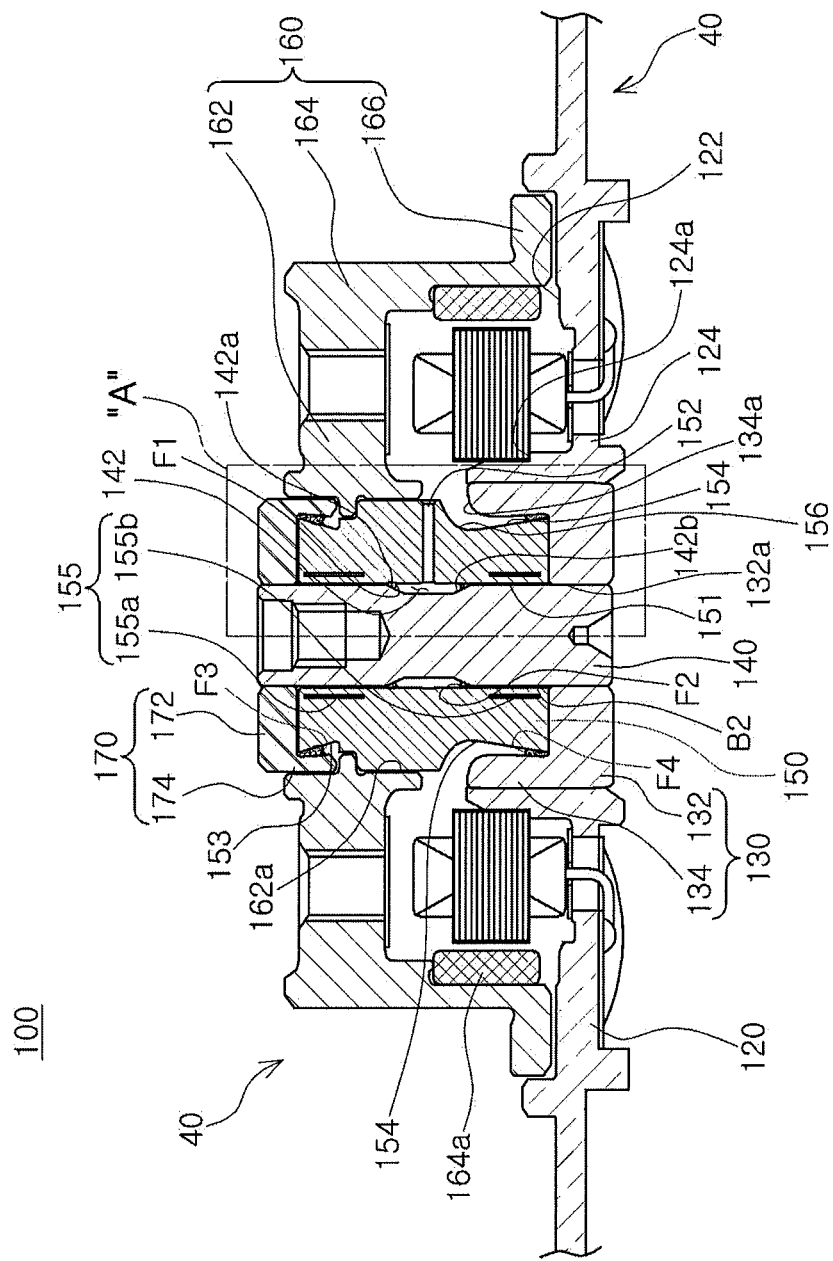
FIG. 1 is a schematic cross-sectional view showing a spindle motor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2:
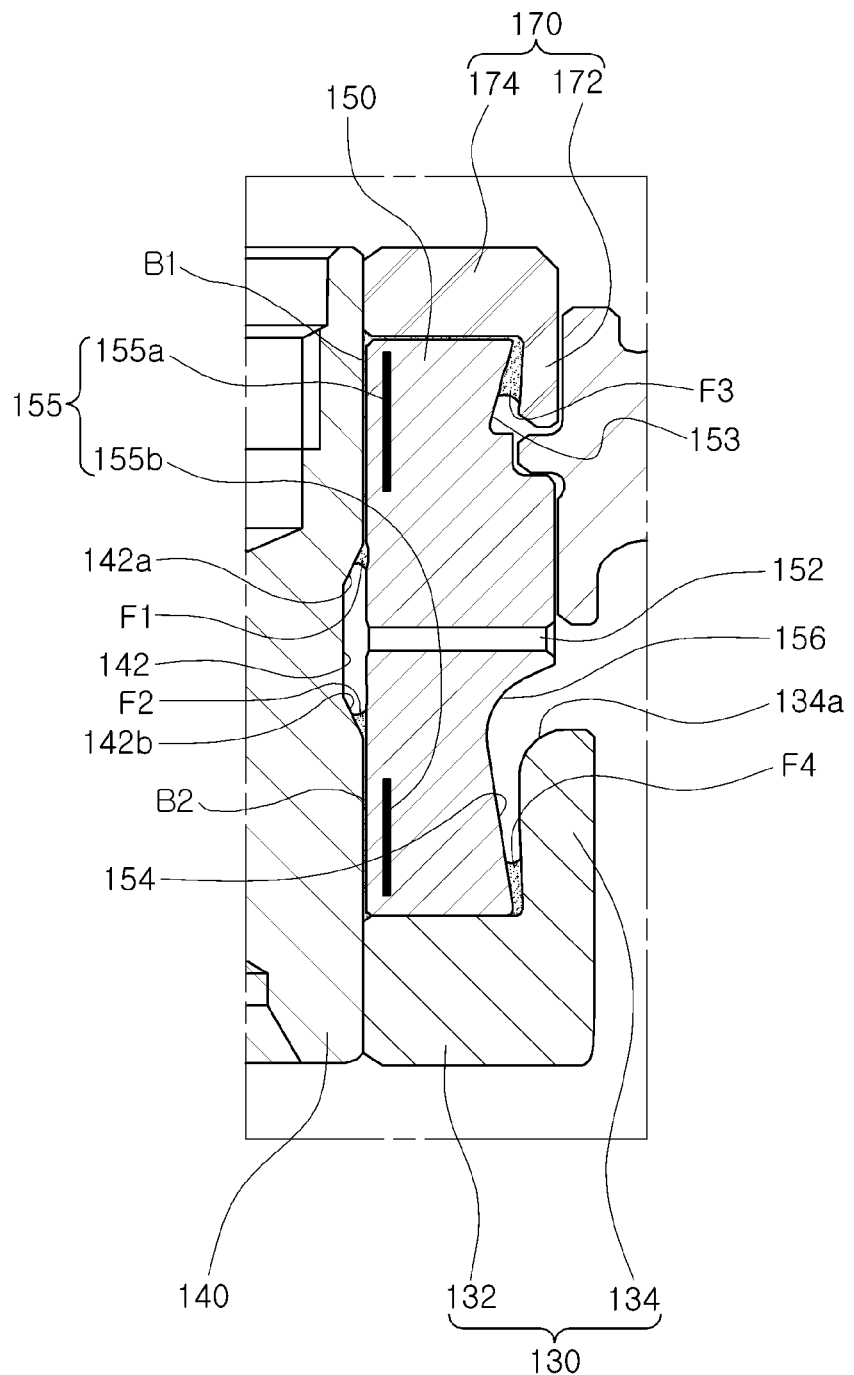
FIG. 2 is an enlarged view of part A of FIG. 1.
Figure 3:
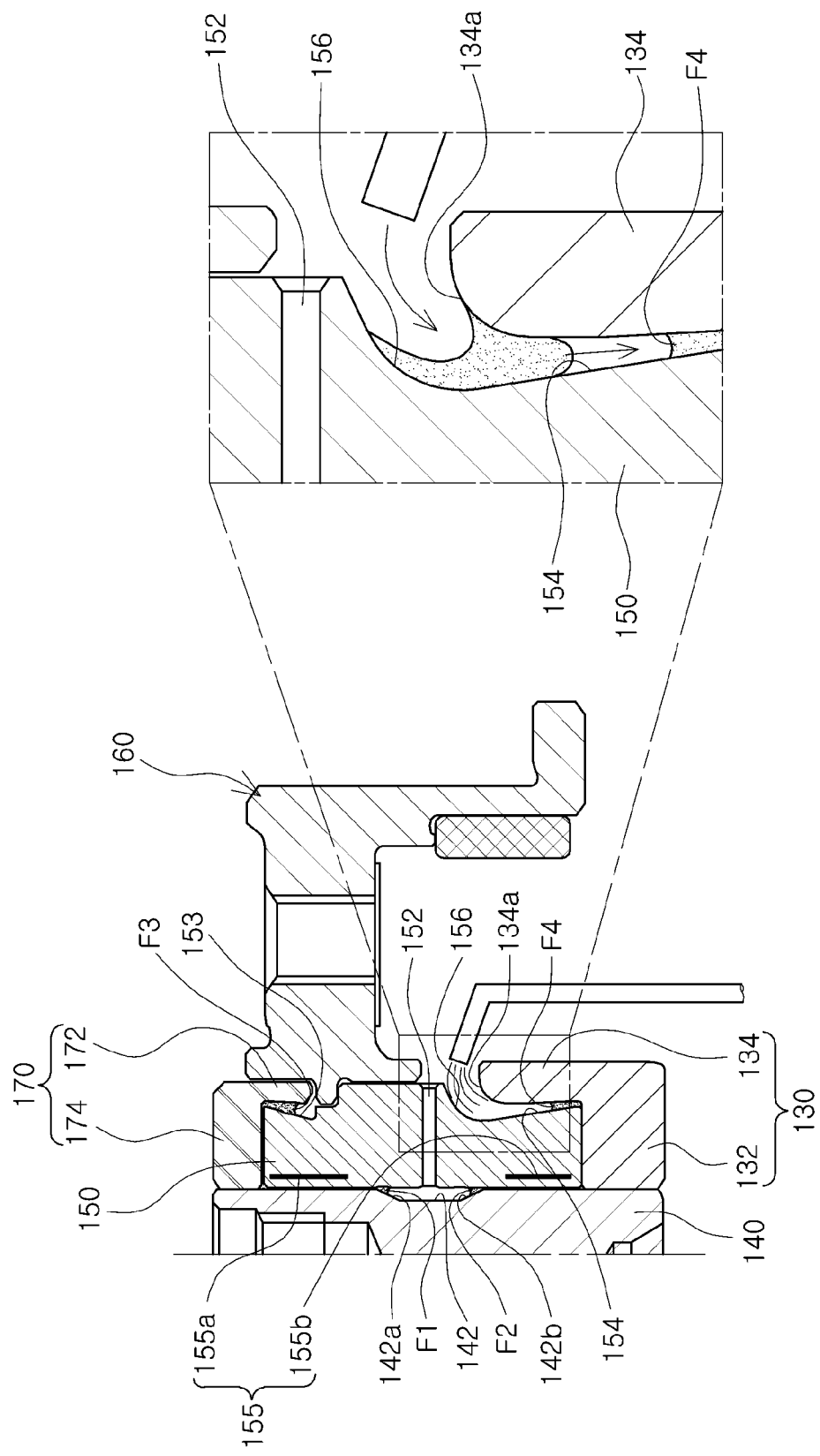
FIG. 3 is a view describing an operation of the spindle motor according to the embodiment of the present invention.

Referring to FIGS. 1 through 3, a spindle motor 100 according to an embodiment of the present invention may include a base member 120, a lower thrust member 130, a shaft 140, a sleeve 150, a rotor hub 160, and an upper thrust member 170.

Meanwhile, the spindle motor 100 according to the embodiment of the present invention may be a motor used in an information recording and reproducing device such as a hard disk driving device for a server, or the like.

In addition, the spindle motor 100, according to the embodiment of the present invention, may be mainly configured of a stator 20 and a rotor 40.

The stator 20, all fixed members with the exception of rotating members, may include the base member 120, the lower thrust member 130, the shaft 140, the upper thrust member 170, a stator core 102, and the like.

In addition, the rotor 40, members rotating based on the shaft 120, may include the sleeve 150, the rotor hub 160, and the like.

Here, terms with respect to directions will be defined. As viewed in FIG. 1, an axial direction refers to a vertical direction, that is, a direction from a lower portion of the shaft 140 toward an upper portion thereof or a direction from the upper portion of the shaft 140 toward the lower portion thereof, and a radial direction refers to a horizontal direction, that is, a direction from the shaft 140 toward an outer peripheral surface of the rotor hub 160 or from the outer peripheral surface of the rotor hub 160 toward the shaft 140.

In addition, a circumferential direction refers to a rotation direction along the outer peripheral surface of the rotor hub 160.

The base member 120 may include a mounting groove 122 provided to form a predetermined space together with the rotor hub 160. In addition, the base member 120 may include a coupling part 124 extended upwardly in the axial direction and having the stator core 102 installed on an outer peripheral surface thereof.

In addition, the coupling part 124 may include a seating surface 124*a* provided on the outer peripheral surface thereof so that the stator core 102 may be seated and installed thereon. Further, the stator core 102 seated on the coupling part 124 may be disposed above the mounting groove 122 of the base member 120.

The lower thrust member 130 may be fixedly installed on the base member 120. That is, the lower thrust member 130 may be insertedly installed in the coupling part 124. More specifically, an outer peripheral surface of the lower thrust member 130 may be bonded to an inner peripheral surface of the coupling part 124.

Meanwhile, the lower thrust member 130 may include a disk part 132 having an inner surface fixedly installed on the shaft 140 and an outer surface fixedly installed on the base member 120 and an extension part 134 extended upwardly from the disk part 132 in the axial direction.

That is, the lower thrust member 130 may have a cup shape having a hollow part and may have a 'ㄴ'-shaped cross section.

In addition, the disk part 132 may be provided with an installation hole 132*a* into which the shaft 140 is installed, and the shaft 140 may be insertedly mounted in the installation hole 132*a*.

In addition, the lower thrust member 130, together with the base member 120, may be included in the fixed member, that is, the stator 20.

Meanwhile, an outer surface of the lower thrust member 130 may be bonded to an inner surface of the base member 120 by an adhesive and/or welding. In other words, the outer surface of the lower thrust member 130 may be fixedly bonded to an inner surface of the coupling part 124 of the base member 120.

In addition, a thrust dynamic pressure groove (not shown) for generating thrust fluid dynamic pressure may be formed in at least one of an upper surface of the lower thrust member 130 and a lower surface of the sleeve 150.

Further, the lower thrust member 130 may also serve as a sealing member for preventing lubricating fluid from being leaked.

In addition, the extension part 134 may include a rounded surface 134*a* formed on an end portion thereof. Further, the rounded surface 134*a* may serve to prevent the lubricating fluid from being condensed in a space formed between the extension part 134 and the sleeve 150 at the time of injecting the lubricating fluid.

That is, the injected lubricating fluid may be further smoothly injected into the space formed between the extension part 134 and the sleeve 150 through the rounded surface 134*a*.

A detailed description thereof will be provided below.

The shaft 140 may have a lower end portion fixedly installed on the base member 120 and may include a recessed groove 142 in a central portion of an outer peripheral surface thereof in the circumferential direction and having upper and lower inclined surfaces 142*a* and 142*b* as upper and lower edges of the recessed groove. That is, the lower end portion of the shaft 140 may be inserted into the installation hole 132*a* formed in the disk part 132 of the lower thrust member 130.

In addition, the lower end portion of the shaft 140 may be bonded to the inner surface of the disk part 132 by an adhesive and/or welding. Therefore, the shaft 140 may be fixed thereto.

Further, although the case in which the shaft 140 is fixedly installed on the lower thrust member 130 is described by way of example in the present embodiment, the present invention is not limited thereto. That is, the shaft 140 may also be fixedly installed on the base member 120.

Meanwhile, the shaft 140, together with the lower thrust member 130 and the base member 120, may also be included in the fixed member, that is, the stator 20.

In addition, the recessed groove 142 may be formed inwardly from the outer peripheral surface of the shaft 140 to serve to separate a lubricating fluid provided in bearing clearances B1 and B2 into two parts. That is, an interface (that is, a liquid-vapor interface) between the lubricating fluid and air may be formed in the clearances formed by the inclined surfaces 142*a* and 142*b* formed on the upper and lower portions of the recessed groove 142 and an inner peripheral surface of the sleeve 150.

Therefore, the lubricating fluid may be separately provided in each of the upper and lower portions of the recessed groove 142.

A detailed description thereof will be provided below.

Meanwhile, although the case in which the recessed groove 142 is formed in the shaft 140 is described by way of example in the present embodiment, the present invention is not limited thereto. That is, the recessed groove 142 may be formed in the sleeve 150.

The sleeve 150 may be rotatably installed with respect to the shaft 140. To this end, the sleeve 150 may include a through hole 151 into which the shaft 140 is inserted. Meanwhile, in the case in which the sleeve 150 is installed on the shaft 140, the inner peripheral surface of the sleeve 150 and the outer peripheral surface of the shaft 140 may be disposed to be spaced apart from each other by a predetermined interval to form the bearing clearances B1 and B2 therebetween.

In addition, the lubricating fluid is provided in these bearing clearances B1 and B2.

Here, describing the bearing clearances B1 and B2 in more detail, the bearing clearances B1 and B2 may be configured of an upper bearing clearance B1 and a lower bearing clearance B2. In addition, the upper bearing clearance B1 includes a space formed between an upper end portion of the shaft 140 and an upper end portion of the sleeve 150 and a space formed between the upper end portion of the sleeve 150 and the upper thrust member 170.

Further, the lower bearing clearance B2 includes a space formed between a lower end portion of the shaft 140 and a lower end portion of the sleeve 150 and a space formed between the lower end portion of the sleeve 150 and the lower thrust member 130.

Meanwhile, the recessed groove 142 is formed in the shaft 140 and serves to form an interface between the lubricating fluid provided in each of the above-mentioned bearing clearances B1 and B2, that is, the upper bearing clearance B1 and the lower bearing clearance B2 and air.

That is, an upper portion of the recessed groove 142, that is, the upper inclined surface 142a may be provided with an interface between the lubricating fluid provided in the upper bearing clearance B1 and the air, that is, a first liquid-vapor interface F1. In addition, a lower portion of the recessed groove 142, that is, the lower inclined surface 142b may be provided with an interface between the lubricating fluid provided in the lower bearing clearance B2 and the air, a second liquid-vapor interface F2.

That is, the recessed groove 142 may have the upper and lower inclined surfaces 142a and 142b formed on the upper and lower portions thereof so that the first and second liquid-vapor interfaces F1 and F2 may be formed by a capillary phenomenon.

In addition, the sleeve 150 may include a communication hole 152 disposed to face the recessed groove 142 to allow a space formed between the recessed groove 142 and the sleeve 150 to be in communication with the outside of the sleeve 150. That is, the communication hole 152 for equalizing pressure between the space formed between the recessed groove 142 and the outside of the sleeve 150 may be formed in the sleeve 150 so that the first and second liquid-vapor interfaces F1 and F2 as described above may be formed.

Meanwhile, the sleeve 150 may have an upper inclined portion 153 formed on an upper end portion thereof so as to form a liquid-vapor interface together with the upper thrust member 170, wherein the upper inclined portion 153 has an outer diameter larger in an upper portion thereof than in a lower portion thereof.

In other words, the upper end portion of the sleeve 150 may be provided with the upper inclined portion 153 having the outer diameter larger in the upper portion thereof than in the lower portion thereof, so that a third liquid-vapor interface F3 may be formed in a space between the outer peripheral surface of the sleeve 150 and an inner peripheral surface of the upper thrust member 170.

Therefore, the lubricating fluid provided in the upper bearing clearance B1 forms the first and third liquid-vapor interfaces F1 and F3.

In addition, the sleeve 150 includes the rotor hub 160 bonded to an upper end portion of the outer peripheral surface thereof.

Meanwhile, the sleeve 150 may have a lower inclined portion 154 formed on a lower end portion of the outer peripheral surface thereof so as to form a liquid-vapor interface together with the extension part 134 of the lower thrust member 130, wherein the lower inclined portion 154 is inclined upwardly in the inner radial direction.

That is, the lower end portion of the sleeve 150 may be provided with the lower inclined portion 154 inclined upwardly in the inner radial direction, so that a fourth liquid-vapor interface F4 may be formed in a space between the outer peripheral surface of the sleeve 150 and the extension part 134 of the lower thrust member 130.

As described above, since the fourth liquid-vapor interface F4 is formed in the space between the lower end portion of the sleeve 150 and the extension part 134, the lubricating fluid provided in the lower bearing clearance B2 forms the second and fourth liquid-vapor interfaces F2 and F4.

In addition, the sleeve 150 may include a dynamic pressure groove 155 formed in the inner surface thereof, wherein the dynamic pressure groove 155 generates fluid dynamic pressure through the lubricating fluid provided in the bearing clearances B1 and B2 at the time of rotation of the sleeve 150. That is, the dynamic pressure groove 155 may include upper and lower dynamic pressure grooves 155a and 155b.

However, the dynamic pressure groove 155 is not limited to being formed in the inner surface of the sleeve 150 but may also be formed in the outer peripheral surface of the shaft 140.

Meanwhile, the sleeve 150 may include a rounded surface 156 disposed to face the rounded surface 134a formed on the end portion of the extension part 134.

Further, the rounded surface 156 of the sleeve 150 and the rounded surface 134a of the extension part 134 may serve to suppress the lubricating fluid from being condensed on an injection path of the lubricating fluid at the time of injecting the lubricating fluid.

That is, as shown in FIG. 3, at the time of injecting the lubricating fluid, the rounded surface 156 of the sleeve 150 and the rounded surface 134a of the extension part 134 may serve to allow the lubricating fluid to be further smoothly injected into the clearance formed between the extension part 134 and the lower inclined part 154 of the sleeve 150.

Therefore, a process of injecting the lubricating fluid may be further smoothly performed.

The rotor hub 160 may be coupled to the sleeve 150 to rotate together with the sleeve 150.

The rotor hub 160 may include a rotor hub body 162 including an insertion part 162a formed therein, the insertion part 162a having the upper thrust member 170 insertedly disposed in an inner portion thereof, a magnet mounting part 164 extended from an edge of the rotor hub body 162 and having a driving magnet 164a mounted on an inner surface thereof, and a disk seating part 166 extended from an edge of the magnet mounting part 164 in the outer radial direction.

Meanwhile, a lower end portion of an inner surface of the rotor hub body 162 may be bonded to the outer surface of the sleeve 150. That is, the lower end portion of the inner surface of the rotor hub body 162 may be bonded to the outer peripheral surface of the sleeve 150 by an adhesive and/or welding.

Therefore, the sleeve 150 may rotate together with the rotor hub 160 at the time of rotation of the rotor hub 160.

In addition, the magnet mounting part 164 may be extended downwardly from the rotor hub body 162 in the axial direction. In addition, the magnet mounting part 164 may include the driving magnet 164a fixedly installed on an inner surface thereof.

The driving magnet 164a may have an annular ring shape and be a permanent magnet generating a magnetic field having a predetermined strength by alternately magnetizing an N pole and an S pole in the circumferential direction.

Meanwhile, the driving magnet 164a may be disposed to face a front end of the stator core 102 having a coil 101 wound therearound and generate driving force through electromagnetic interaction with the stator core 102 having the coil 101 wound therearound so that the rotor hub 160 may rotate.

That is, when power is supplied to the coil 101, the driving force rotating the rotor hub 160 is generated by the electromagnetic interaction between the stator core 102 having the coil 101 wound therearound and the driving magnet 164a disposed to face the stator core 102, such that the rotor hub 160 may rotate together with the sleeve 150.

Meanwhile, although the case in which the rotor hub 160 is a separate member from the sleeve 150 to be fixedly installed on the sleeve 150 is described by way of example in the present embodiment, the present invention is not limited thereto. For example, the rotor hub 160 and the sleeve 150 may be formed integrally with each other.

Meanwhile, the upper thrust member 170 may be fixedly installed on the upper end portion of the shaft 140 and form the liquid-vapor interface together with the sleeve 150.

Meanwhile, the upper thrust member 170 may include a body 172 having an inner surface bonded to the shaft 140 and a protrusion part 174 extended from the body 172 to form the liquid-vapor interface F3 together with the upper inclined portion 153.

The protrusion part 174 may be extended downwardly from the body 172 in the axial direction and have an inner surface disposed to face the upper inclined portion 153.

In addition, the protrusion part 174 may be extended from the body 172 so as to be in parallel with the shaft 140.

Further, the upper thrust member 170 may be insertedly disposed in a space formed among the upper end portion of the outer peripheral surface of the shaft 140, the outer surface of the sleeve 150, and the inner surface of the rotor hub 160.

In addition, the upper thrust member 170, together with the base member 120, the lower thrust member 130, and the shaft 140, is included in the fixed member, the stator 20.

Meanwhile, since the upper thrust member 170 is fixedly installed on the shaft 140 and the sleeve 150 rotates together with the rotor hub 160, when the sleeve 150 rotates, the third liquid-vapor interface F3 formed in a space between the upper inclined portion 153 of the sleeve 150 and the protrusion part 174 may be inclined toward the upper inclined portion 153 of the sleeve 150 by the rotation of the sleeve 150.

Therefore, scattering of the lubricating fluid may be reduced by centrifugal force.

In addition, an outer peripheral surface of the upper thrust member 170 and the inner surface of the rotor hub 160, disposed to face the outer peripheral surface of the upper thrust member 170, may form a labyrinth seal. That is, an outer surface of the upper thrust member 170 and the inner surface of the rotor hub body 162 may be disposed to be spaced apart from each other by a predetermined interval and form the labyrinth seal so as to suppress the air containing evaporated lubricating fluid from moving to the outside.

Therefore, the flow of the air containing the evaporated lubricating fluid to the outside may be suppressed, whereby a reduction in the lubricating fluid may be suppressed.

Meanwhile, a thrust dynamic pressure groove (not shown) for generating thrust dynamic pressure may be formed in at least one of a lower surface of the upper thrust member 170 and the upper surface of the sleeve 150 disposed to face the lower surface of the upper thrust member 170.

In addition, the upper thrust member 170 may also serve as a sealing member preventing the lubricating fluid provided in the upper bearing clearance B1 from being leaked upwardly.

As described above, the rounded surface 156 of the sleeve 150 and the rounded surface 134a of the extension part 134 may serve to suppress the lubricating fluid from being condensed on the injection path of the lubricating fluid at the time of injecting the lubricating fluid.

That is, as shown in FIG. 3, at the time of injecting the lubricating fluid, the rounded surface 156 of the sleeve 150 and the rounded surface 134a of the extension part 134 may serve to allow the lubricating fluid to be further smoothly injected into the clearance formed between the extension part 134 and the lower inclined part 154 of the sleeve 150.

Therefore, the process of injecting the lubricating fluid may be further smoothly performed. Further, a manufacturing yield may be finally improved.

As set forth above, according to embodiments of the present invention, since a lubricating fluid may be injected into a space formed between rounded surfaces of a lower thrust member and a sleeve, condensation of the lubricating fluid may be suppressed.

Therefore, the process of injecting the lubricating fluid may be further smoothly performed.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
    a lower thrust member fixedly installed on a base member and including an extension part extended upwardly in an axial direction;
    a shaft having a lower end portion fixedly installed on the lower thrust member;
    a sleeve rotatably installed with respect to the shaft;
    an upper thrust member fixedly installed on the shaft to correspond to an upper portion of the sleeve; and
    a rotor hub rotating together with the sleeve,
    wherein an end portion of the extension part and a surface of the sleeve opposed thereto are provided with rounded surfaces, and
    wherein the rounded surfaces form a tapered shape with a curved surface that serves to allow a lubricating fluid to be smoothly injected into a space formed between the rounded surfaces.

2. The spindle motor of claim 1, wherein either of a central portion of an outer peripheral surface of the shaft and a central portion of an inner peripheral surface of the sleeve is provided with a recessed groove formed in a circumferential direction and having upper and lower inclined surfaces as upper and lower edges thereof.

3. The spindle motor of claim 2, wherein the sleeve forms upper and lower bearing clearances together with the shaft and the upper and lower thrust members, and
    upper and lower portions of an outer peripheral surface of the sleeve are provided with upper and lower inclined portions so as to form liquid vapor interfaces together with the upper and lower thrust members.

4. The spindle motor of claim 3, wherein the sleeve includes a communication hole allowing a space formed between the inner peripheral surface thereof and the recessed groove to be in communication with the outside.

\* \* \* \* \*